United States Patent

Toyoizumi

[11] Patent Number: 6,054,820
[45] Date of Patent: Apr. 25, 2000

[54] MOTOR DRIVE CONTROL SYSTEM

[75] Inventor: Kiyoto Toyoizumi, Odawara, Japan

[73] Assignee: Canon Kabushiki Kaisha, Tokyo, Japan

[21] Appl. No.: 09/213,862

[22] Filed: Dec. 17, 1998

[30] Foreign Application Priority Data

Dec. 19, 1997 [JP] Japan ..................... 9-365247

[51] Int. Cl.$^7$ .................................. H02P 6/08
[52] U.S. Cl. .................. 318/254; 318/705; 318/721; 318/722; 318/724
[58] Field of Search .................. 318/138, 254, 318/439, 700, 705, 720, 721, 722, 724

[56] References Cited

U.S. PATENT DOCUMENTS

| | | | |
|---|---|---|---|
| 4,511,827 | 4/1985 | Morinaga et al. ............ | 318/254 |
| 4,546,293 | 10/1985 | Peterson et al. ............ | 318/254 |
| 4,608,527 | 8/1986 | Glennon et al. ............ | 318/685 |
| 5,097,192 | 3/1992 | Iijima ........................ | 318/712 |
| 5,448,141 | 9/1995 | Kelley et al. ............... | 318/254 |

*Primary Examiner*—Bentsu Ro
*Attorney, Agent, or Firm*—Fitzpatrick, Cella, Harper & Scinto

[57] ABSTRACT

A digital motor drive control system comprises drive means for performing phase switching by use of the phase timing signal from phase switching timing generating means and driving of the motor in response to a PWM clock signal generated by PWM signal generating means where means is provided for synchronizing the PWM clock signal of the PWM signal generating means with a phase switching timing. The number of PWM clock pulses of each phase of the motor is made equal to each other, so that rotational irregularities of the motor are decreased.

8 Claims, 6 Drawing Sheets

MOTOR DRIVE CONTROL SYSTEM

BACKGROUND OF THE INVENTION

1. Field of the Invention

The present invention relates to a motor drive control system that carries out a motor drive control digitally by use of a PWM (Pulse Width Modulation) drive.

2. Related Background Art

In a digital speed control using a direct PWM drive of a motor, a PWM drive frequency signal may be generated by an oscillation circuit, e.g., an RC oscillation circuit using a resistance and a capacitor, thereby controlling the digital speed control non-synchronously with each set of switching timings of the motor.

In such a motor drive control system, however, the PWM drive pulse number of each phase and the time from the switching timing of each phase until the first PWM drive pulse are different from each other and deviation in the driving timings of each phase has occurred. As a result, rotational irregularity has occurred, particularly when a large PWM pulse number cannot be used for the switching timings of each phase by the stepping speed, and the loss, in a motor which has a large number of rotations, the the on-times of the respective PWM pulses are different from each other as the pulses are non-synchronous with each other, and the effects of the above-mentioned timing irregularity are increased whereby the rotational irregularity is also increased. Further, since the system uses a resistance and capacitor, a frequency variance has occurred due to manufacturing variances of the devices or elements, and the characteristic variance due to temperature.

SUMMARY OF THE INVENTION

Accordingly, the object of the present invention is to provide a motor drive control system in which the drive switching timing of each phase of the motor and the PWM drive frequency are synchronized with each other.

Another object of the present invention is to provide a motor drive control system in which PWM drive pulse numbers of the respective phases of the motor are identified.

Other objects of the present invention will become apparent from the detailed embodiments described below.

DETAILED DESCRIPTION OF THE PREFERRED EMBODIMENTS

Some embodiments of the present invention will be described with reference to drawings hereinbelow.

Figure 1:
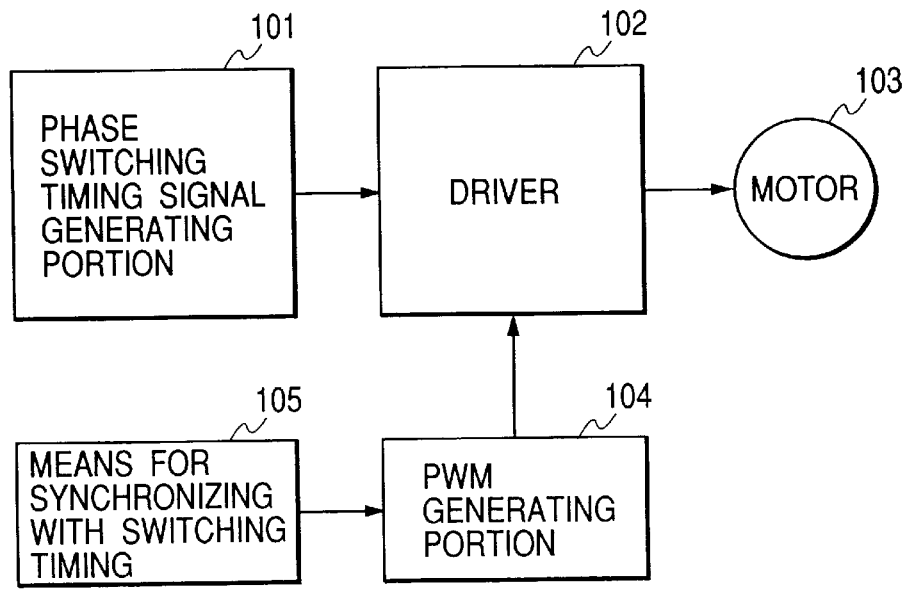
FIG. 1 is a block diagram showing a basic configuration of a motor drive control system according to the present invention.

FIG. 1 is a block diagram showing a basic configuration of a motor drive control system according to the present invention. In FIG. 1, the reference numeral 101 denotes a phase switching timing signal generating portion for generating a phase switching timing signal, 102 denotes a driver for performing motor drive, 103 denotes a motor, 104 denotes a PWM signal generating portion for generating a PWM clock, signal 105 denotes a synchronizing means for synchronizing a phase switching timing with a PWM clock.

In the above-mentioned configuration, the driver 102 performs motor drive phase-switches by use of the phase switching timing signal from the phase switching timing signal generating portion 101 and drives the motor 103 in response to the PWM clock signal generated by the PWM signal generating portion 104. At this time, the PWM clock signal generated by the PWM signal generating portion 104 uses the phase switching timing signal synchronous with the phase switching timing where the phase switching timing signal is synchronized with the phase switching timing by the synchronizing means 105.

Figure 4:
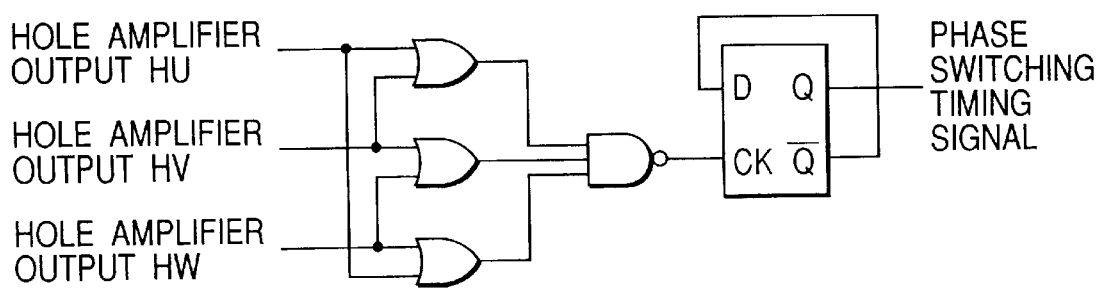
FIG. 4 is a circuit diagram showing details of a phase switching logic circuit shown in FIG. 3.

A first embodiment concretely showing the block of the motor drive control system shown in FIG. 1 will now be described with reference to FIGS. 2 to 4 herein below.

Figure 2:
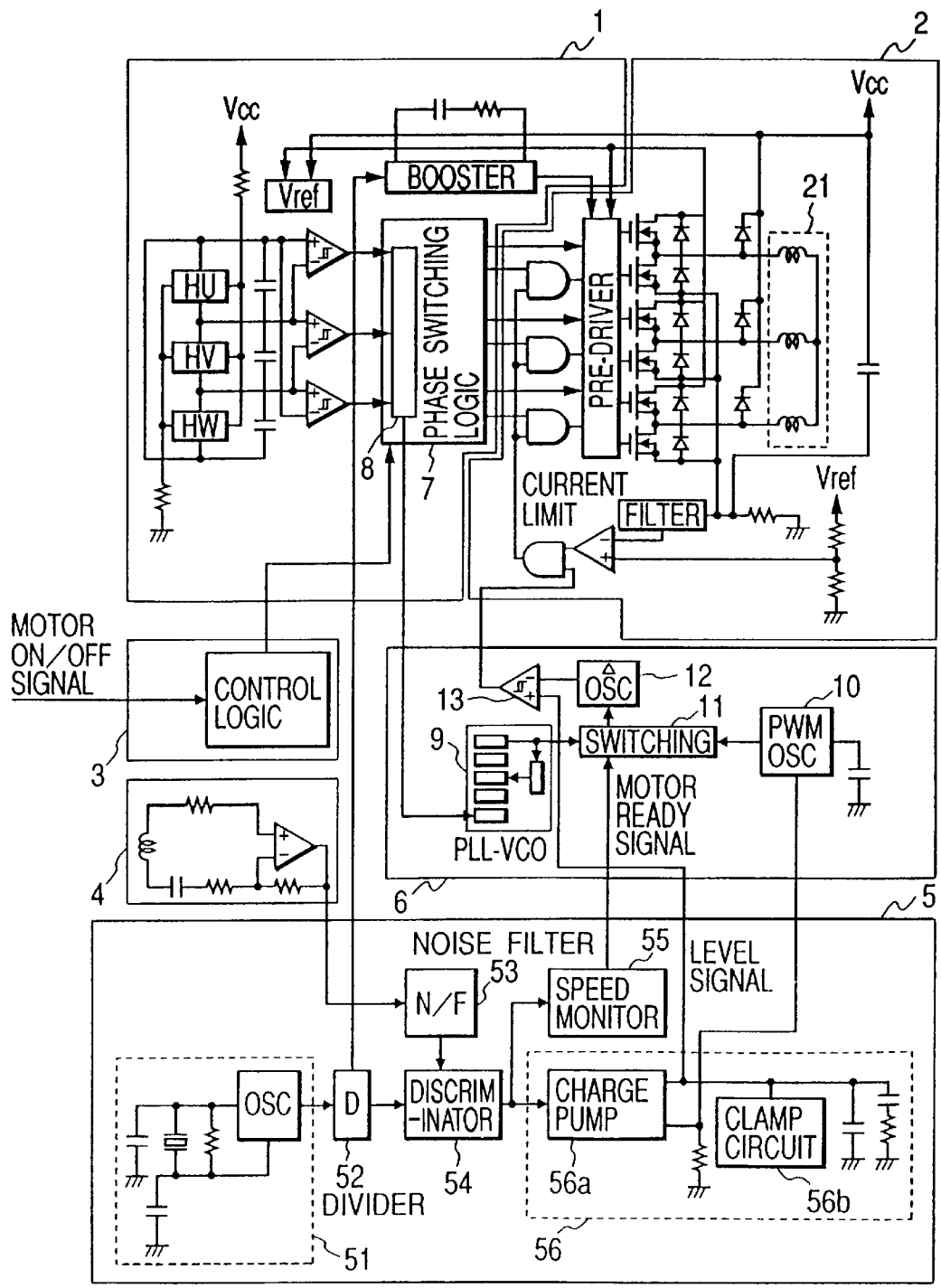
FIG. 2 is a control circuit block diagram according to a first embodiment concretely showing a block of a motor drive control system in FIG. 1.

FIG. 2 is a motor drive control circuit block diagram concretely showing a block of a motor drive control system shown in FIG. 1. In FIG. 1, the reference numeral 1 denotes a phase switching timing signal generating portion for generating a phase switching timing signal, 2 denotes a driver for performing motor drive for motor 21, 3 denotes a motor drive control logic portion, 4 denotes an FG detecting portion for generating a rotational signal in response to rotation of the motor, 21 and 5 denotes a speed control portion. The motor drive control system shown in FIG. 1 is configurated by well known techniques. Such well known techniques involve a motor driver "HA13605" commercially available from Hitachi, Ltd. as one example.

The speed control portion 5 includes a reference clock signal generating portion 51 (clock signal generator 51), a divider 52 which divides a reference clock signal from the reference clock generating portion, 51 a noise filter 53, a discriminator 54, a speed monitor 55, and a charging/discharging circuit 56. The discriminator 54 compares a clock signal from the clock signal generator 51, divided by the divider 52, with a rotational signal from the FG detecting portion through the noise filter 53. The charging/discharging circuit 56 consists of a charge pump 56a, a clamp circuit 56b, a resistance, and a capacitance. When the charging/discharging circuit 56 has no speed above a desired speed, it is charged to increase the voltage; on the other hand, when the charging/discharging circuit 56 has a speed above a desired speed, it is discharged to decrease the voltage.

This voltage generates a level signal which determines the pulse width of the PWM clock pulse signal which will be described later. At a predetermined speed, a motor ready signal is output.

The reference numeral 7 denotes a phase switching logic portion in the phase switching timing signal generating portion 1, and 8 denotes an output buffer of a hall amplifier. The reference numeral 6 denotes a PWM frequency generating portion. In this PWM frequency generating portion 6, the reference numeral 9 denotes a PLL circuit that is a first PWM frequency generating circuit. This PLL circuit 9 generates a first PWM clock signal having a constant times the phase switching timing signal based on the phase switching timing signal generated by the phase switching timing signal generating portion 1. The reference numeral 10 denotes a second PWM frequency generating circuit which generates a second PWM clock signal. The reference numeral 11 is a switching circuit, which switches the second PWM clock signal generated by the second PWM frequency generating circuit 10 to the first PWM clock signal generated by the PLL circuit 9, which is the first PWM frequency generating circuit, in response to the rotational speed of the motor, as detected by the speed control portion 5. The reference numeral 12 denotes a chopping wave generating circuit which shapes a PWM frequency signal output from the switching circuit 11 to a triangular wave. The reference numeral 13 denotes a pulse width control portion which can vary the drive pulse width, for controlling the rotational signal of the motor in response to the level signal from the speed control portion 5.

Thus, in the first stage after the start of a rotational drive of the motor, the second PWM clock signal generated by the second PWM frequency generating circuit 10 through the switching circuit 11 is supplied to the driver 2 through the pulse width control portion 13. The driver 2 switches phases in response to a phase switching timing signal from the phase switching timing signal generating portion 1 to drive the motor 21, in response to the second PWM clock signal generated by the PWM signal generating portion 104.

In this motor drive, a rotational signal is output through the noise filter 53. This rotational signal is compared by a value divided with the divider 52, with the discriminator 54. For example, in the above-mentioned motor driver HA13605 of Hitachi, Ltd., when a 2048 clock pulse signal is the same as a rotational signal 1 pulse, a desired speed can be obtained. If it is found by the above comparison that a desired speed is not obtained, the charging/discharging circuit 56 is charged to increase the voltage. This voltage becomes a level signal which determines the pulse width of a second PWM clock signal; signal. In the second PWM clock of the second PWM frequency generating circuit 10, a chopping wave is generated by the chopping wave generating circuit 12 and the second PWM clock signal can be varied by this chopping wave and the level signal of the charging/discharging circuit 56 so that the drive pulse width is increased in the pulse width control portion 13. As a result, the pulse width of the second PWM clock signal is increased, whereby driving of the motor 21 allows the speed of the motor 21 to increase. Accordingly, when the motor speed reaches the desired value, a motor ready signal is output from a speed monitor 55. The switching circuit 11 is switched from the second PWM clock signal to the first PWM clock signal generated from the PLL circuit 9 which is the first PWM signal generating means, by receiving the motor ready signal. Thus, the first PWM clock signal generated by the PLL circuit 9 is applied to the driver 2 through the switching circuit 11, and the driver 2 is phase-switched by a phase switching timing signal from the phase switching timing signal generating portion 1. Then driving of the motor 21 is performed in response to the first PWM clock signal generated by the PLL circuit 9. In this case, since the PLL circuit 9 generates a first PWM clock signal which is a constant-fold over the phase switching timing signal in response to the phase switching timing signal generated by the phase switching timing signal generating portion 1, the first PWM clock is synchronized with the phase switching timing signal. For example, when a frequency is varied to six-fold, the motor drive pulse of each phase becomes six pulses equally.

Therefore, in the first stage after the start of the rotational drive of the motor, the second PWM clock signal is controlled by a frequency signal generated by the second PWM frequency generating circuit 10. When a desired number of revolutions of the motor is obtained by use of the frequency signal generated by the second PWM frequency generating circuit 10, the frequency signal, is switched to the PWM frequency signal generated by use of the motor ready signal from the speed control portion 5. The wave in this PWM frequency signal is shaped to a chopping wave by use of the PWM-controlled chopping wave generating circuit 12. As a result, the drive pulse width of the second PWM clock signal can be varied by a level signal generated by the speed control portion 5 and rotational speed control of the motor can be performed.

Figure 7:
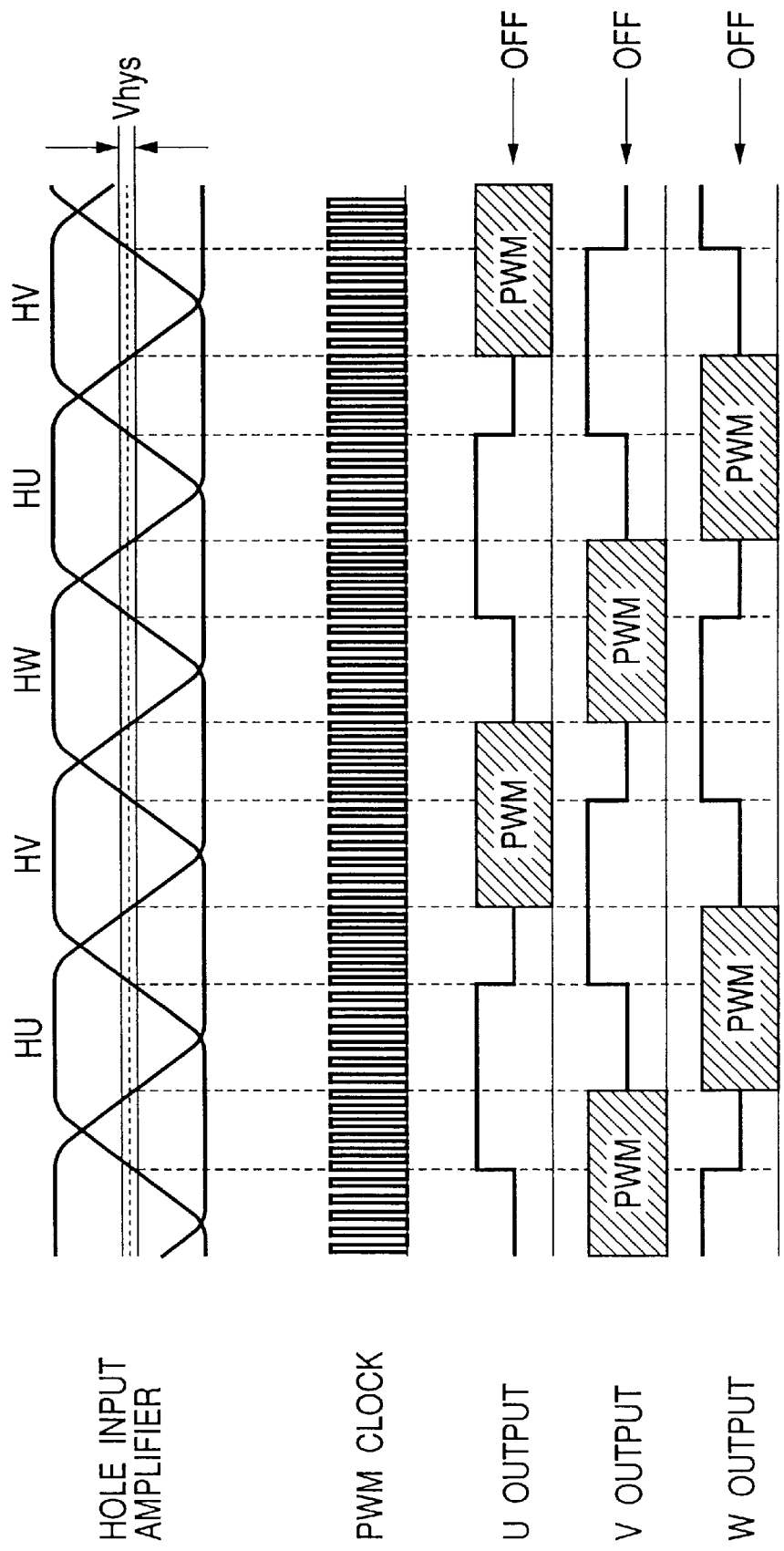
FIG. 7 is a signal waveform diagram showing a state where the drive switching timing of each phase of a motor and the PWM drive frequency are synchronous with each other.

FIG. 7 shows a non-synchronous state before being switched to the PWM frequency by use of the switching circuit. Even if the same drive pulse is applied to each phase, since the PWM clock signal timing is different from the switching timing of each phase, integrated values of the respective phase pulses are differentiated from each other. As a result, since the number of pulses becomes small for the drive time of each phase of the motor rotating at a high speed and small rotational torque of the motor has driving force differences, rotational irregularities of the motor occur due to the integrated value differences.

Figure 3:
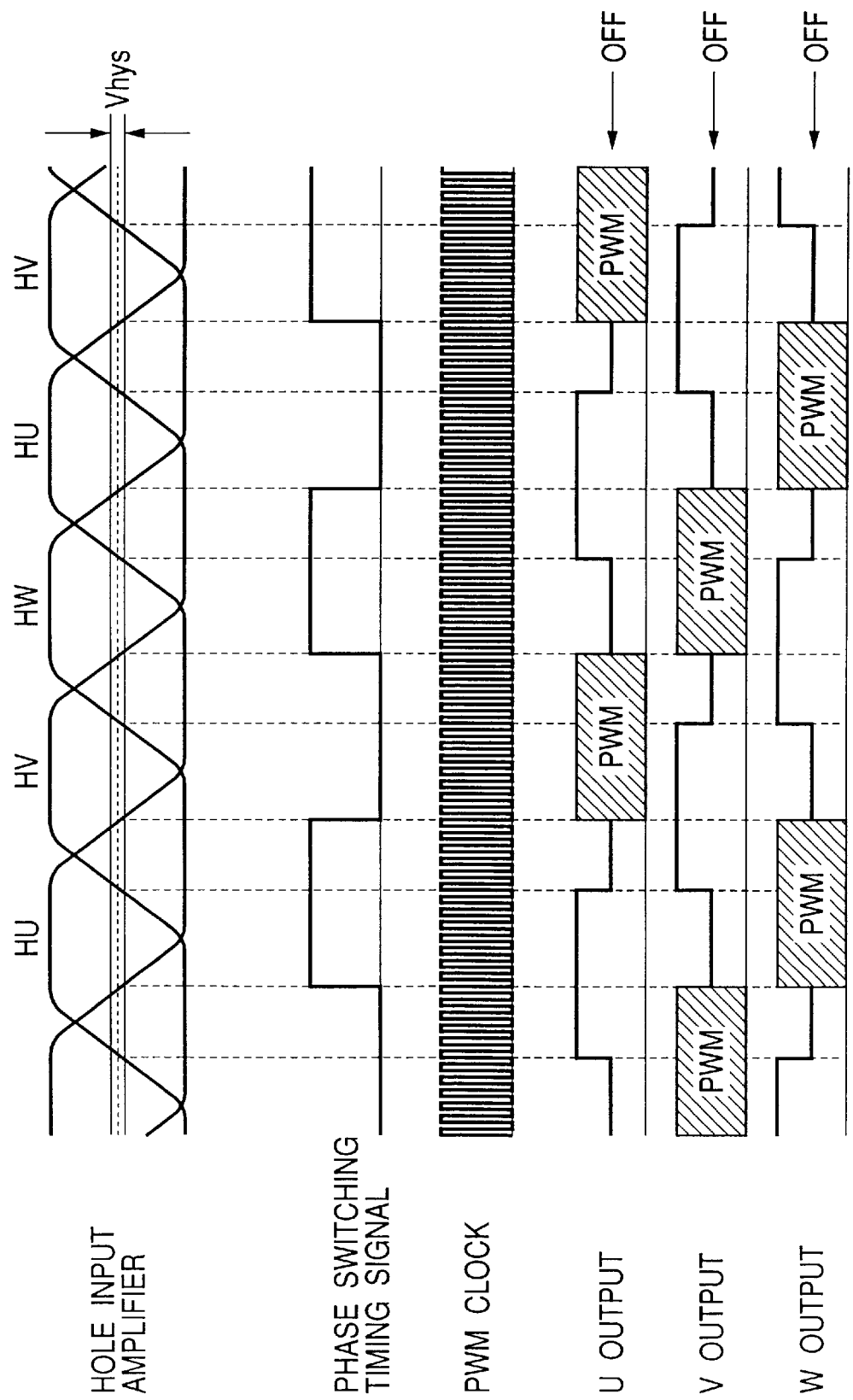
FIG. 3 is a signal waveform diagram for each of various control circuit portions shown in FIG. 2.

After switching of the PWM frequency, which is a characteristic of the present invention, the PWM frequency signal has a relation of constant-fold over the phase switching timing, as shown in FIG. 3. Therefore, the numbers of the PWM drive pulses of the respective phases become the same and the time from the switching timing until the first drive pulse can be identified at each phase. When the same drive pulse is applied to each of the phases, the integrated values of the pulses of the phases are equalized. Accordingly, the accuracy of the rotational speed control of the motor and the stability of the motor can be enhanced.

A second embodiment concretely showing the block of the motor drive control system of FIG. 1 will now be described with reference to FIGS. 5 and 6.

In this second embodiment, synchronization of the PWM clock signal with the phase switching timing is obtained by the reference clock signal from the reference clock signal generating portion and an FG signal, which is a rotational signal from the FG detecting portion, based on the motor rotation.

Figure 5:
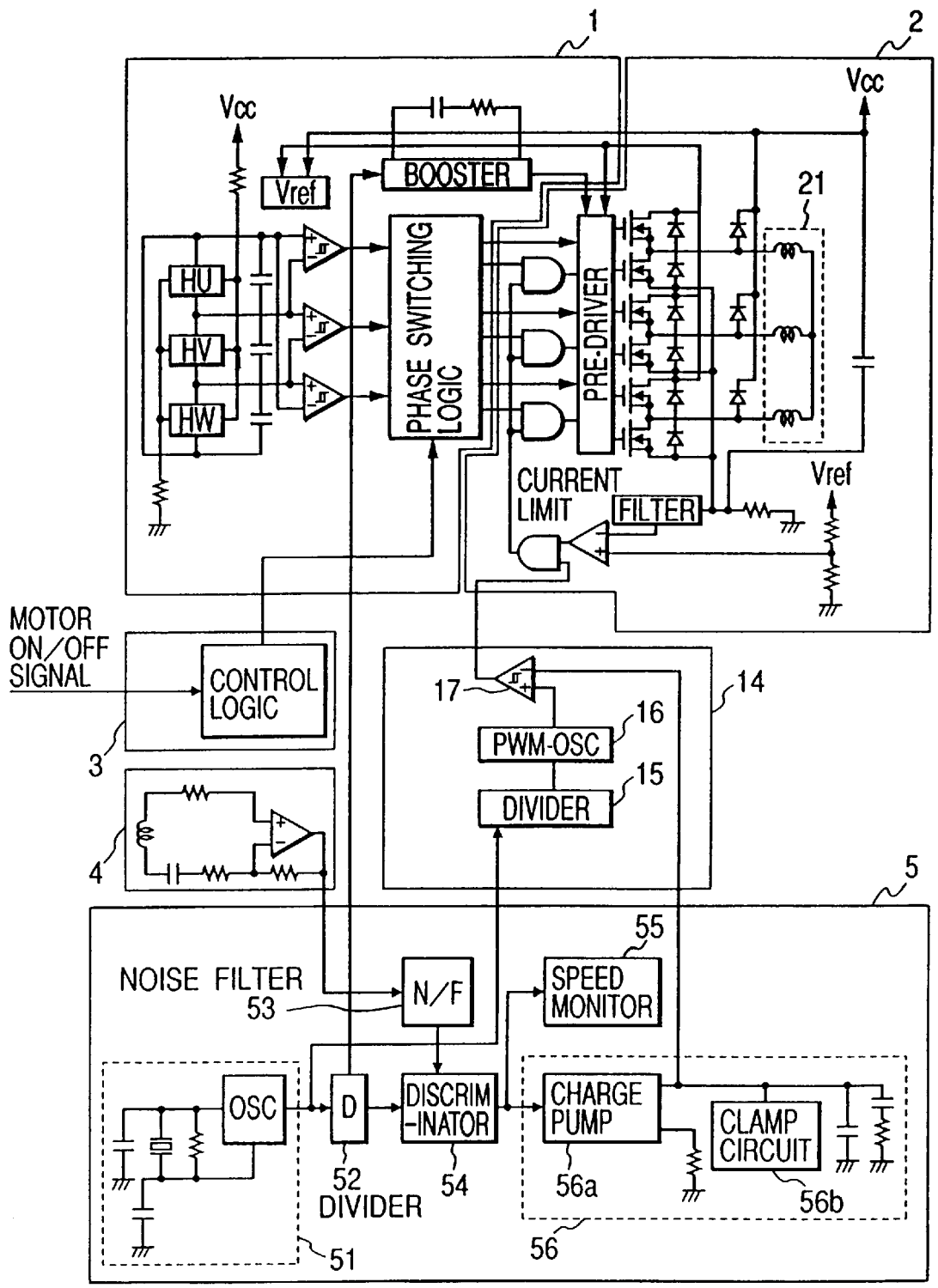
FIG. 5 is a control circuit block diagram according to a second embodiment concretely showing a basic configuration of a motor drive control system in FIG. 1.
Figure 6:
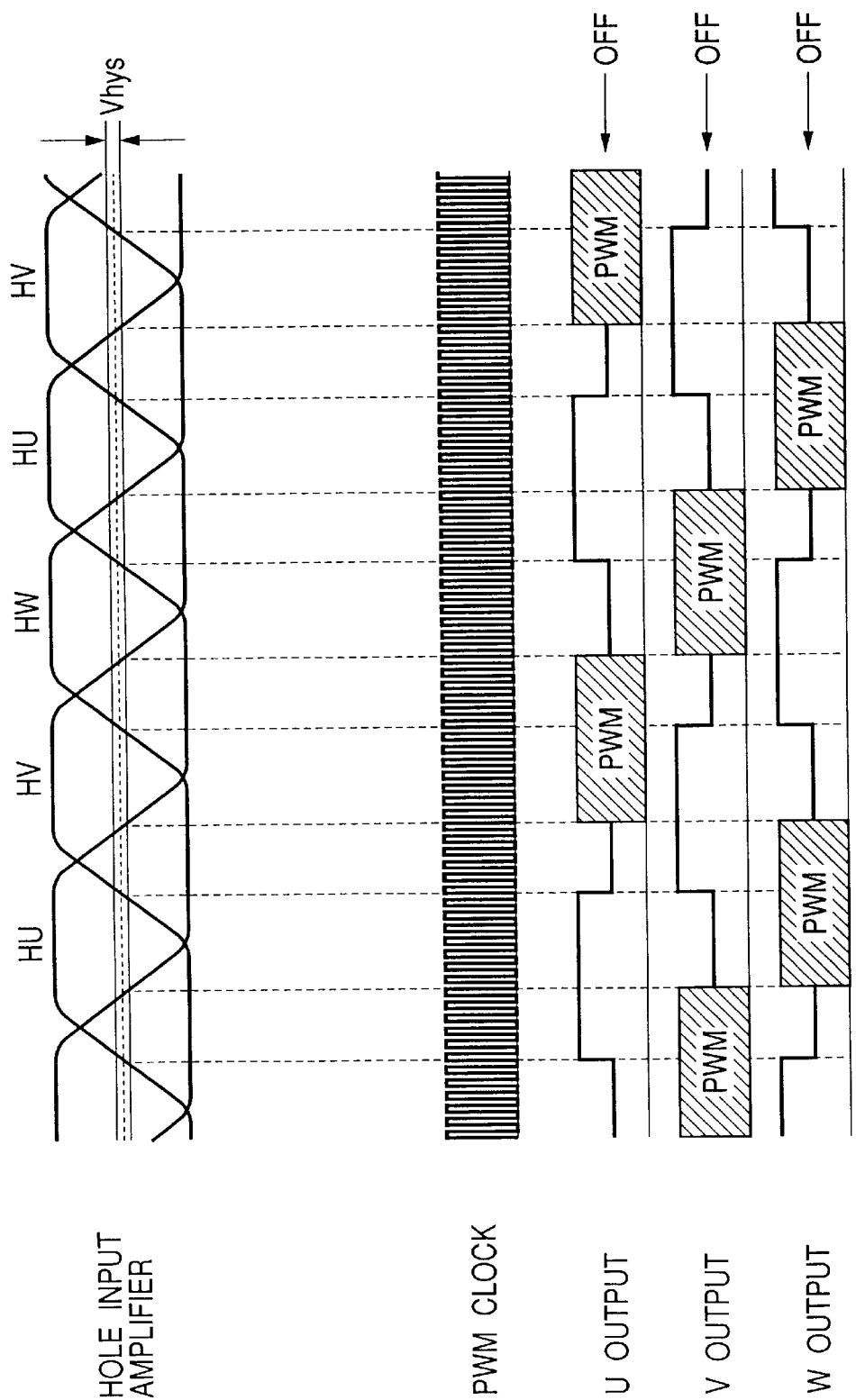
FIG. 6 is a signal waveform diagram for each of various control circuit portions shown in FIG. 5.

FIG. 5 is a motor drive control circuit block diagram concretely showing a block of a motor drive control system in FIG. 1. In FIG. 5, the same elements as in the first embodiment are denoted by the same references as therein and concrete descriptions are omitted. The difference between the first embodiment and second embodiment resides in a PWM frequency generating portion 14. In this PWM frequency generating portion 14, a reference clock signal generated by a reference clock signal generating portion 51 is divided to be PWM clock signals pulses. The PWM clock signal pulses are shaped to chopping waves by a chopping wave generating circuit 16 and transmitted to a pulse width control portion 17.

The motor rotational control is performed so that the reference clock signal is synchronized with an FG signal which is a detecting signal for the rotation of the motor. The reference clock fosc has a relation between the FG signal ffg, the divisional number divided by a divider 5, and the counted number counted by a discriminator 54. The relation is expressed by a function, that is, fosc=d×c×ffg. In this case, the FG signal ffg is n (integer)-fold over the number of revolutions of the motor. Further, the phase switched number per revolution of the motor corresponds to a number N of one phase per revolution of the motor. In this case, the PWM frequency fqwm has a relation to the reference clock fosc. The relation is expressed by a function, that is, fqwm=fosc/D, where D is a divisional number in the divider 15 for the PWM frequency generating portion 14.

Therefore, the following function, that is, fqwm=[(d×c)/D]×ffg, is obtained. In the relation between the FG signal and the phase switching, the number of switches per revolution is expressed by N/n. Thus, if a function, [(d×c)/D]×N/n is set to be an integer, the PWM frequency signal can be synchronized with the phase switching timing.

Therefore, if this relation is satisfied, the drive timing of each phase can be synchronized with the PWM frequency, whereby a PWM frequency synchronized with the phase switching timing can be generated from the reference clock signal by use of only the divider. As a result, an increase in cost and complexity of circuits can be prevented, and also, rotational irregularities of the motor can be decreased as in embodiment 1. Further, the rotational accuracy and stability can be enhanced.

Thus, in the first stage after the start of a rotational drive of the motor, the PWM clock signal divided by the divider 15 is supplied to the driver 2 through the chopping wave generating circuit 16 and the pulse width control portion 17. The driver 2 switches phases in response to a phase switching timing signal from the phase switching timing signal generating portion 1 to drive the motor 21, in response to the PWM clock signal divided by the divider 16.

In this motor drive a rotational signal is output through the noise filter 53. This rotational signal is compared by a value divided with the divider 52, with the discriminator 54. If it is found by the above comparison that a desired speed is not obtained, the charging/discharging circuit 56 is charged to increase the voltage. This voltage becomes a level signal which determines the pulse width of a PWM clock signal. In the PWM clock signal, a chopping wave is generated by the chopping wave generating circuit 16 and the PWM clock signal can be varied by this chopping wave and the level signal of the charging/discharging circuit 56 so that the drive pulse width is increased in the pulse width control portion 17. As a result, the pulse width of the PWM clock signal is increased, whereby driving of the motor 21 allows the speed of the motor 21 to increase. Accordingly, when the motor speed reaches the desired value, that is, when each clock pulse is equalized with one pulse of the rotational signal, the drive pulse width becomes a constant width through the pulse width control portion 17. The PWM clock signal having a constant drive pulse width is applied to the driver 2 through the switching circuit 11, and the driver 2 is phase-switched by a phase switching timing signal from the phase switching timing signal generating portion 1. Then driving of the motor 21 is performed in response to the PWM clock signal having a constant drive pulse width.

As described above, according to the present invention, the drive switching timing of each phase and the PWM drive frequency are synchronized with each other, and the PWM pulse number of each phase is equalized with each other. Further, the time from the phase switching timing until the first pulse can be also equalized with each other.

Therefore, a motor having a large number of revolutions incurs rotational irregularities of the rotation of motor when controlled non-synchronously. Further, when a large PWM pulse number for switching timing of each phase cannot be used due to the switching speed and loss, the on-time of a non-synchronous pulse of each phase is different from each other and the motor is effected by the pulse deviations whereby rotational irregularities of the motor are increased. Furthermore, since the motor uses a resistance and a capacitor, variance in frequency which is derived from the irregularities of the device and the change of properties by temperature can be prevented. As a result, while preventing an increase in the cost and complexity of circuits, rotational irregularities of the motor can be decreased and a motor rotational control having a high accuracy can be realized.

The present invention is effective to perform high accuracy rotational control of a drive motor for an optical disk device having a high speed rotation of the motor and a polygon drive motor for a laser printer, digital copy machine etc.

What is claimed is:

1. A motor drive control system comprising:

phase switching timing signal generating means for generating a phase switching timing signal using a Hall amplifier output obtained by detection of a motor rotational position;

PWM signal generating means for generating a PWM clock signal;

synchronizing means for synchronizing the PWM clock signal generated by said PWM signal generating means with a phase switching timing, where said synchronizing means generates a PWM clock signal which is a constant-fold over the phase switching timing signal generated by said PWM signal generating means in response to the phase switching timing signal generated by said phase switching timing signal generating means; and drive means for performing phase switching using the phase switching timing signal generated by said phase switching timing signal generating means and driving of the motor in response to the PWM clock signal generated by said PWM signal generating means.

2. A motor drive control system, comprising:

phase switching timing signal generating means for generating a phase switching timing signal using a Hall amplifier output obtained by detection of a motor rotational position;

PWM signal generating means for generating a PWM clock signal;

synchronizing means for synchronizing the PWM clock signal generated by said PWM signal generating means with a phase switching timing;

drive means for performing phase switching using the phase switching timing signal generated by said phase switching timing signal generating means and driving of the motor in response to the PWM clock signal generated by said PWM signal generating means;

a reference clock signal generating means for generating a reference clock signal;

a detecting means for detecting a rotational speed of the motor and generating a rotational signal in response to said rotational speed;

wherein said synchronizing means generates a PWM frequency signal synchronized with a phase switching timing from said PWM signal generating means using the reference clock signal from said reference clock signal generating means and the rotational signal from said detecting means, and wherein when said reference clock signal is defined as fosc, a divisional number for dividing the reference clock signal is defined as D, a divisional number for dividing the rotational signal ffg from said detecting means is defined as d, and a count with discriminator is defined as c, an equation fosc=d×c×ffg is satisfied, and when a number of the detecting means for one revolution of the motor is defined as n and a number of one phase per revolution of the motor is defined as N, a function {(d×c)/D}×(N/n) is an integer.

3. A motor drive control system comprising:

phase switching timing signal generating means for generating a phase switching timing signal using a Hall amplifier output obtained by detection of a motor rotational position;

PWM signal generating means for generating a PWM clock signal which is a constant-fold over the phase switching timing signal in response to the phase switching timing signal generated by said phase switching timing signal generating means; and drive means for performing phase switching using the phase switching timing signal generated by said phase switching timing signal generating means and driving of the motor in response to the PWM clock signal generated by said PWM signal generating means.

4. A motor drive control system according to claim 3, further comprising:

detecting means for detecting a rotational speed of the motor; and drive pulse width varying means for varying the drive pulse width of the PWM clock signal to control the rotational speed of the motor, in response to the rotational speed of the motor detected by said detecting means.

5. A motor drive control system comprising:

phase switching timing signal generating means for generating a phase switching timing signal using a Hall amplifier output obtained by detection of a motor rotational position;

first PWM signal generating means for generating a first PWM clock signal which is a constant-fold over the phase switching timing signal in response to the phase switching timing signal generated by said phase switching timing signal generating means;

second PWM signal generating means for generating a second PWM clock signal;

detecting means for detecting a rotational speed of the motor; and switching means for switching the second PWM clock signal generated by said second PWM signal generating means to the first PWM clock signal generated by said first PWM signal generating means, in response to the rotational speed of the motor detected by said detecting means; and drive means for performing phase switching using the phase switching timing signal from said phase switching timing signal generating means and driving of the motor in response to the PWM clock signal output from said switching means.

6. A motor drive control system according to claim 5, further comprising:

drive pulse width varying means for varying the drive pulse width of said PWM clock signal to control the rotational speed of the motor, in response to the rotational speed of the motor detected by said detecting means.

7. A motor drive control system comprising:

phase switching timing signal generating means for generating a phase switching timing signal using a Hall amplifier output obtained by detection of a motor rotational position;

reference clock signal generating means for generating a reference clock signal;

detecting means for detecting a rotational speed of the motor and generating a rotational signal in response to the detected rotational speed;

PWM signal generating means for generating a PWM clock frequency signal synchronized with a phase switching timing using the reference clock signal and the signal from said detecting means; and drive means for performing phase switching using the phase switching timing signal generated by said phase switching timing signal generating means and driving of the motor in response to the PWM clock frequency signal generated by said PWM signal generating means, wherein the following relationship is satisfied: fosc=d×c×ffg, where fosc is a reference clock signal, D is a divisional number for dividing the reference clock signal, ffg is rotational signal, d is a divisional number for dividing the rotational signal ffg from the detecting means, and c is a count by a discriminator, and wherein the function {(d×c)/D}×(N/n) is an integer, where n is a number of the detecting means for one revolution of the motor, and N is a number of one phase per revolution of the motor.

8. A digital speed control device for digital-speed controlling a motor drive by sequentially switching a drive pulse which is imparted to each of motor coils at a phase switching timing, said device comprising:

reference clock generating means for generating a reference clock signal;

a first divider that generates the reference clock signal generated by said reference clock generating means;

a PWM-OSC that generates a PWM clock signal using the output of said first divider;

FG detecting means for detecting the rotational frequency of the motor and generating an FG signal;

a second divider that divides the reference clock signal generated by said reference clock generating means and generates an output;

a discriminator that counts the output from said second divider using said FG signal; and drive pulse varying means for varying a drive pulse width for controlling a motor rotational speed in response to the output from said PWM-OSC and motor rotational speed obtained from said FG detecting means, wherein when said reference clock frequency is defined as fosc, an FG signal frequency is defined as fgg, a divisional number obtained with said second divider is defined as d, and a count with discriminator is defined as c, an equation fosc=d×c×ffg is satisfied, and when a divisional number with said first divider is defined as D, a detection number of said detecting means for one revolution of the motor is defined as n, and a number of one phase per revolution of the motor is defined as N, a function {(d×c)/D}×(N/n) is an integer.

* * * * *

UNITED STATES PATENT AND TRADEMARK OFFICE
CERTIFICATE OF CORRECTION

PATENT NO. : 6,054,820
DATED : April 25, 2000
INVENTOR(S) : KIYOTO TOYOIZUMI

It is certified that error appears in the above-identified patent and that said Letters Patent is hereby corrected as shown below:

Column 1

Line 24, "the" (second occurrence) should be deleted.

Column 2

Line 12, "clock, signal" should read --clock signal,--
    Line 23, "timing" should read --timing,--.
    Line 45, "portion,51" should read --portion 51,--.
    Line 64, "hall" should read --Hall--.

Column 3

Line 39, "clock" should read --clock signal--.

Column 4

Line 7, "signal," should read --signal--.
    Line 56, "signals" should read --signal--.

UNITED STATES PATENT AND TRADEMARK OFFICE
CERTIFICATE OF CORRECTION

PATENT NO. : 6,054,820
DATED : April 25, 2000
INVENTOR(S) : KIYOTO TOYOIZUMI

It is certified that error appears in the above-identified patent and that said Letters Patent is hereby corrected as shown below:

Column 5

Line 32, "drive" should read --drive,--.
    Line 48, "equalized" should read --synchronized--.

Column 8

Line 59, "fgg" should read --ffg--.

Signed and Sealed this

Tenth Day of April, 2001

Attest:

NICHOLAS P. GODICI

*Attesting Officer*    *Acting Director of the United States Patent and Trademark Office*